(12) United States Patent
Doehler et al.

(10) Patent No.: US 9,080,504 B2
(45) Date of Patent: Jul. 14, 2015

(54) ACTUATING DEVICE FOR AN EXHAUST GAS FLOW CONTROL ELEMENT OF AN EXHAUST GAS TURBOCHARGER

(75) Inventors: Sonja Doehler, Reutlingen (DE); Stephan Maier, Muensingen (DE)

(73) Assignee: ELRINGKLINGER AG, Dettingen (DE)

( * ) Notice: Subject to any disclaimer, the term of this patent is extended or adjusted under 35 U.S.C. 154(b) by 412 days.

(21) Appl. No.: 13/478,896

(22) Filed: May 23, 2012

(65) Prior Publication Data

US 2012/0319020 A1 Dec. 20, 2012

(30) Foreign Application Priority Data

Jun. 17, 2011 (DE) .................. 10 2011 077 766

(51) Int. Cl.
    *F02B 37/18* (2006.01)
(52) U.S. Cl.
    CPC ............ *F02B 37/183* (2013.01); *Y02T 10/144* (2013.01)
(58) Field of Classification Search
    CPC .............................. F02B 37/183; Y02T 10/144
    USPC .......... 251/214, 298–299; 277/591, 594–596; 60/602
    See application file for complete search history.

(56) References Cited

U.S. PATENT DOCUMENTS

| | | |
|---|---|---|
| 3,542,484 A | 11/1970 | Mason |
| 3,695,777 A | 10/1972 | Westphal |
| 3,893,786 A | 7/1975 | Rahnke et al. |
| 4,363,600 A | 12/1982 | Thebert |
| 4,893,474 A | 1/1990 | Miller et al. |
| 5,146,753 A | 9/1992 | Potter |
| 5,158,305 A | 10/1992 | Halling |
| 5,172,552 A | 12/1992 | Elpern et al. |
| 5,207,559 A | 5/1993 | Clevenger |
| 7,644,583 B2 | 1/2010 | Leavesley |
| 2002/0098080 A1 | 7/2002 | Arnold |
| 2007/0237601 A1* | 10/2007 | Agg et al. .............. 411/92 |
| 2010/0101539 A1* | 4/2010 | Meier et al. ............. 123/508 |

FOREIGN PATENT DOCUMENTS

| | | |
|---|---|---|
| DE | 1926338 A | 12/1970 |
| DE | 69806506 T2 | 10/2003 |
| DE | 102007018618 A1 | 10/2007 |
| DE | 102009030520 A1 | 1/2010 |
| DE | 102010043147 A1 | 10/2011 |
| DE | 102010049466 A1 | 4/2012 |
| EP | 1040268 B1 | 7/2002 |

(Continued)

*Primary Examiner* — Marina Tietjen
(74) *Attorney, Agent, or Firm* — Leydig, Voit & Mayer, Ltd.

(57) ABSTRACT

Actuating device for a gas flow control element arranged in an inflow path of a turbocharger turbine and connected to a spindle traversing a turbine housing wall and fixed to an adjusting element adjoining said wall; a resilient seal pretensioned in the spindle axis direction comprises at least one annular sealing disc traversed by the spindle and being a resilient sheet metal ring is installed between said wall and the adjusting element said ring being pressed with bead feet of at least one annular half bead against an abutment surface fixed relative to the adjusting element and an abutment surface fixed relative to said wall, and the seal together with said abutment surfaces and at least the spindle delimit a space being sealed gastightly except for at least a gap between the spindle and said wall.

50 Claims, 7 Drawing Sheets

(56) References Cited

FOREIGN PATENT DOCUMENTS

| | | |
|---|---|---|
| FR | 2743846 A | 7/1997 |
| GB | 820595 A | 9/1959 |
| JP | 05-248253 A | 9/1993 |
| JP | 08-334030 A | 12/1996 |
| JP | 09-072250 A | 3/1997 |
| JP | 11229886 A | 8/1999 |
| JP | 2011-043119 A | 3/2011 |
| WO | WO 2010/135104 A2 | 11/2010 |
| WO | WO 2012/052124 A1 | 4/2012 |

* cited by examiner

FIG.5B

ACTUATING DEVICE FOR AN EXHAUST GAS FLOW CONTROL ELEMENT OF AN EXHAUST GAS TURBOCHARGER

The present disclosure relates to the subject matter disclosed in German application number 10 2011 077 766.0 of Jun. 17, 2011, which is incorporated herein by reference in its entirety and for all purposes.

The invention relates to an actuating device for an exhaust gas flow control element arranged in an exhaust gas inflow path of an exhaust gas turbocharger turbine of an internal combustion engine.

In an internal combustion engine charged by an exhaust gas turbocharger with large exhaust gas volume flows (per time unit) in order to avoid too great a pressure in the turbine region of the turbocharger, the exhaust gas inflow path of the turbine of the exhaust gas turbocharger is provided with an exhaust gas flow control element in the form of a so-called wastegate flap to conduct the exhaust gas flow partly or even totally past the turbine. Apart from the wastegate flap of a one-stage charger system, the aforementioned exhaust gas flow control element may, however, also be a regulating flap for the second and/or each further stage of a multistage charger system. In an exhaust gas turbocharger with variable turbine geometry (VTG) a pivotable flow directing element can be provided in the exhaust gas inflow path of the turbine. Therefore, the aforementioned exhaust gas flow control element is to be understood as a wastegate flap, a regulating flap or such a flow directing element.

Wastegate flaps are disclosed, for example, in WO 2010/135104 A (FIG. 1) but also in U.S. Pat. No. 4,893,474 (FIG. 4), U.S. Pat. No. 5,146,753 (FIGS. 3A and 3B) and U.S. Pat. No. 5,172,552 (FIG. 4).

The exhaust gas flow control element is usually adjusted by means of a spindle which is connected to the control element. The spindle extends through a channel passing through a wall of a turbine housing, is rotatably mounted in the channel and is fixedly connected to an adjusting element located on the outside of the turbine housing and adjacent to the housing. The adjusting element is usually an arm or lever which is pivotable about the spindle axis and, for example, is actuated by a pneumatic actuator.

With such an actuating device, the sealing of the lead-through of the spindle through the wall of the turbine housing is problematic because the exhaust gases in the exhaust gas inflow path of the exhaust gas turbocharger turbine are under high pressure. If this lead-through is not sealed at all, as is the case with some of the known such actuating devices, this results, depending on the operational state of the engine, in a more or less large part and at times even a very large part of the exhaust gases that flow into the turbine housing issuing as leakage flow from the turbine housing, which is not only disadvantageous for emission reasons but also leads to a loss in performance of the turbocharger.

Therefore, in known actuating devices of the kind described, the lead-through of the spindle through the wall of the turbine housing was sealed off by piston ring-like seals, which constitutes a relatively complicated and, therefore, relatively expensive measure.

A different sealing for the lead-through of the spindle through the wall of the turbine housing is disclosed in U.S. Pat. No. 7,644,583 B2 (FIGS. 5 and 6). In this known construction, the spindle is rotatably mounted in a bush fixed in the turbine housing, and the gap between the outer circumference of the spindle and the inner circumference of the bush is sealed by a disk spring of conical cross section, which has a central opening for passage of the spindle therethrough, is clamped with axial pretensioning between an end face of the bush and an end face of an abutment fixed relative to the adjusting element, and lies resiliently with its radially outer circumferential edge against the end face of the bush and with its radially inner circumferential edge against the end face of the abutment fixed relative to the adjusting element. The basic principle of such a disk spring results in its having at its outer circumference and at the rim of its central opening rigid rim edges which lead to the risk that when the region to be sealed is exposed to the hot exhaust gases during operation of the turbocharger, these rigid rim edges do not lie against the adjacent sealing surfaces so as to seal effectively overall, i.e., against the end face of the bush and the end face of the abutment fixed relative to the adjusting element.

Further axial seals in the region between a bush in which the spindle is mounted and the adjusting element are disclosed in DE 10 2009 030 520 A1 (FIGS. 2 and 3). In a first embodiment (FIG. 2), a sheet metal ring is provided, which is of approximately cup-shaped configuration with a central opening through which the spindle passes, and with a circular cylindrical outer circumferential region which, like a circular cylindrical outer circumferential region of a collar formed on the adjusting element and facing the bush, is coaxial with the spindle axis. The resilient base of the cup-shaped sheet metal ring is provided with a half bead, which extends concentrically with the spindle axis, and between which and the central opening of the sheet metal ring, the base thereof forms a circular ring-shaped sealing zone which, like a circular ring-shaped abutment surface on the end face of the bush, lies in a plane perpendicular to the spindle axis and lies with surface-to-surface contact and resiliently in the direction of the spindle axis against the abutment surface of the bush. The outer circumferential region of the sheet metal ring forms with the outer circumferential region of the adjusting element collar a sealing point and is welded to or fixedly connected in some other way to this collar. Since the second sealing point, namely the circular ring-shaped sealing zone of the sheet metal ring surrounding the central opening of the sheet metal ring and lying radially within the half bead, and the circular ring-shaped abutment surface provided for the sealing zone on the end face of the bush are spaced at a distance from the spindle circumference, the outer circumferential region of the sheet metal ring must be so connected to the collar of the adjusting element that permanent sealing is reliably provided there against passage of the hot exhaust gases also when the turbocharger is in operation, which, in practice, would mean that a circular ring-shaped weld seam closed within itself, which is permanently gastight overall, is required for the connection, which makes the installation of the sheet metal ring relatively complicated and increases the manufacturing costs of the device.

The second of the two embodiments (FIG. 3) disclosed in DE 10 2009 030 520 A1 differs from the embodiment described hereinabove only in that the seal consists of two cup-shaped sheet metal rings, of which the one sheet metal ring facing the adjusting element is inserted into the other sheet metal ring facing the bush and comprises a half bead which in comparison with the half bead of the sheet metal ring facing the bush projects in the opposite direction in relation to the spindle axis, so that the two inner circumferential regions of the two sheet metal rings include between them a gap which is open in the direction towards the spindle circumference and tapers outwards in a radial direction in relation to the spindle axis. A circular ring-shaped sealing zone between the central opening and the half bead of the sheet metal ring facing the adjusting element lies with surface-to-surface contact and resiliently in the direction of the spindle axis against an abutment surface of the adjusting element collar. The abutment surface lies in a plane perpendicular to the spindle axis, surrounds the spindle in the shape of a circular ring and is spaced at a distance from the spindle circumference. In order for this known construction to be able to fulfill its sealing function, it is necessary for at least the two outer circumferential regions of the two cup-shaped sheet metal rings inserted in each other to be connected to each other in a gastight manner all the way around in order that hot exhaust gases issuing from the ring gap between the outer circumference of the spindle and the inner circumference of the bush will not result in a leakage of gas from the device. This second embodiment, therefore, has a disadvantage comparable to that of the first embodiment described hereinabove, and, for the sake of completeness, it should also be mentioned that the bases of the two cup-shaped sheet metal rings lie directly against each other radially outside of their half beads.

The object underlying the invention was to create for an actuating device of the kind mentioned at the outset a sealing device for the region between a spindle moving the exhaust gas flow control element or a turbine housing holding the spindle and an adjusting element serving to actuate the spindle and connected to the spindle, which with respect to its manufacture and assembly is simpler and more cost-effective than the sealing devices disclosed in DE 10 2009 030 520 A1 and described hereinabove.

Departing from a construction as disclosed in DE 10 2009 030 520 A1 in conjunction with its FIG. 2, i.e., from an actuating device for an exhaust gas flow control element arranged in an exhaust gas inflow path of an exhaust gas turbocharger turbine of an internal combustion engine, the actuating device comprising a spindle connected to the control element and extending through a channel which passes through a wall of a turbine housing, the spindle being rotatably mounted in the channel and being fixedly connected to an adjusting element located on the outside of the turbine housing and adjacent to the housing, a seal through which the spindle passes being arranged between a first abutment surface fixed relative to the adjusting element and a second abutment surface located on the outside of the turbine housing, fixed relative to the turbine housing and facing the adjusting element, and the two abutment surfaces each forming a contact surface through which the spindle axis passes and which functions as sealing point, sealing zones of the seal surrounding the spindle axis interacting in a sealing manner with these contact surfaces, and the seal having only a single sheet metal ring which surrounds the spindle axis and is resilient in the direction of the spindle axis, the sheet metal ring having at least one such offset surrounding the spindle axis and forming a half bead that ring-shaped regions of the sheet metal ring lying in a radial direction in relation to the spindle axis on either side of the offset are offset from each other in the direction of the spindle axis, in order to accomplish the set object, it is proposed that the sealing device be so configured that the first abutment surface faces the turbine housing and the spindle is connected in a gastight manner to the adjusting element, the two contact surfaces face each other in the direction of the spindle axis, but are offset from each other in a radial direction in relation to the spindle axis, the sealing zones of the seal formed by the ring-shaped sheet metal ring regions lie resiliently in the direction of the spindle axis against the abutment surfaces/contact surfaces, and the two abutment surfaces/contact surfaces together with the seal and at least the spindle form and delimit a space which is sealed in a gastight manner except for at least a gap between the spindle and the wall of the turbine housing. In order that the sealing zones of the seal formed by the ring-shaped sealing ring regions will always lie reliably in a resilient and sealing manner against the abutment surfaces, the sheet metal ring is made of a metal which at operating temperatures of the seal (as a rule, at least about 500° C. and less than about 650° C.) has spring steel-like spring characteristics (which, therefore, correspond approximately to the spring characteristics of a classic sheet spring steel, but which no longer has any spring characteristics at the high operating temperatures in question here). Embodiments are preferred, in which the sheet metal ring is formed by a metal sheet made of a nickel-based alloy, which was subjected to heat treatment and thereby hardened in order to obtain the necessary spring characteristics. Cobalt-based alloys, for example, could also be considered as alternatives, but are considerably more expensive than nickel-based alloys. With corresponding design of the at least one half bead or offset (it is also possible for two half beads to be provided, which together form one full bead), the sheet metal ring forms at the transition from the offset or bead into the adjacent ring-shaped regions of the sheet metal ring preferably in each case a sealing line with high (in relation to the surface of the sealing line) pressure, between the sheet metal ring and the two contact surfaces/abutment surfaces, namely with the so-called bead feet. It is particularly advantageous for the two sealing zones of the seal or the sheet metal ring to lie only with these sealing lines in a sealing manner against the contact surfaces/abutment surfaces.

Depending on the detail design of the sealing device in accordance with the invention, the adjusting element or a part provided thereon may also contribute towards forming and delimiting the aforementioned space to be sealed.

The invention leads to the advantages that the seal formed by only a single sheet metal ring is designed and can be manufactured and assembled in a very simple manner, and that the sheet metal ring lies in the direction of the spindle axis with axial pretensioning against the two contact surfaces/abutment surfaces in a reliably sealing manner all the way around, so that the gastight welded connection of the known construction can be dispensed with and the above-described problems with a disc spring avoided.

Embodiments are particularly preferred, in which the sheet metal ring has only a single offset and, therefore, only one half bead as the sheet metal ring then has relatively large spring travel in the direction of the spindle axis with relatively low spring hardness of the bead. If the sheet metal ring as described hereinabove is then so designed that it forms in the installed state sealing lines with a high specific surface pressure, a more reliable permanent sealing is obtained as compared with only surface contact.

In particularly advantageous embodiments of the actuating device in accordance with the invention, the spindle is rotatably mounted in a bush which passes through the wall of the turbine housing and is fixed therein.

Embodiments are preferred, in which the bush borders in a gastight manner on the wall of the turbine housing. In embodiments with a bush, the abutment surface/contact surface fixed relative to the turbine housing can be provided on the bush, more particularly, preferably on the end face of the bush that faces the adjusting element. The abutment surface/contact surface fixed relative to the turbine housing may, however, also be formed on the turbine housing itself—in the latter case, the gap between the outer circumference of the bush and the turbine housing need not necessarily be gastight.

A particularly simple construction is obtained when the abutment surface fixed relative to the adjusting element is formed on the adjusting element itself.

The abutment surfaces could, in principle, be of conical or stepped design (in relation to the spindle axis)—the sealing zones of the sheet metal ring must then be of corresponding shape—, but it is simpler and, therefore, preferable for the abutment surfaces in section along the spindle axis (and around the spindle axis) to be of flat and smooth configuration and to preferably extend perpendicularly to the spindle axis.

Particularly good characteristics of the sheet metal ring with respect to its axial spring travel and its axial spring stiffness are obtained by its half bead being so configured that the ratio of the height of the offset measured in the direction of the spindle axis to the width of the offset measured in a radial direction in relation to the spindle axis is between 1:2 and 1:7, preferably between 1:4 and 1:6 and, in particular, about 1:5.

In view of the influences (high temperatures and hot exhaust gases) to which the seal of the actuating device in accordance with the invention is subjected during operation, it is recommended that the sheet metal ring be provided at least in the region of its sealing zones with a coating which reduces the slide friction and/or the frictional wear. In particular, this is a coating which consists at least substantially of boron nitride or sintered bronze.

In actuating devices with a bush in which the spindle is mounted, there may be very little space available for sealing purposes on the end face of the bush, and so it is preferable to provide sealing with the seal not on the bush, but on the turbine housing. If the axial spacing of the sealing surface provided on the turbine housing and interacting with the seal from the adjusting element and/or the axial tolerances of the construction are large, then sealing with only a single sheet metal disc may prove problematic because the limited space which usually also prevails in a radial direction in relation to the spindle axis makes it necessary for the half bead of the sheet metal ring to be very steep or the offset to be relatively large in the axial direction, which may lead to an undesirably large degree of spring stiffness of the sheet metal ring.

Therefore, for such a case it is proposed that the basic principle of the invention be modified such that the seal has two sheet metal rings surrounding the spindle axis and configured in accordance with the invention, which are adjacent to each other in the direction of the spindle axis, but between which is arranged a ring-shaped spacer element with which the sheet metal rings interact in a sealing manner. By using spacer elements of different thickness, it is then also possible to bridge different axial spacings with the seal without different sheet metal rings being required.

Departing from the construction disclosed in FIG. 3 of DE 10 2009 030 520 A1, i.e., from an actuating device for an exhaust gas flow control element arranged in an exhaust gas inflow path of an exhaust gas turbocharger turbine of an internal combustion engine, the actuating device comprising a spindle connected to the control element and extending through a channel which passes through a wall of a turbine housing, the spindle being rotatably mounted in the channel and being fixedly connected to an adjusting element located on the outside of the turbine housing and adjacent to the housing, a seal through which the spindle passes being arranged between a first abutment surface fixed relative to the adjusting element and a second abutment surface located on the outside of the turbine housing, fixed relative to the turbine housing and facing the adjusting element, and the two abutment surfaces each forming a contact surface through which the spindle axis passes and which functions as sealing point, sealing zones of the seal surrounding the spindle axis interacting in a sealing manner with these contact surfaces, and the seal having two sheet metal rings which surround the spindle axis, each of which has one such offset surrounding the spindle axis and forming a half bead that ring-shaped regions of the sheet metal ring lying in a radial direction in relation to the spindle axis on either side of the offset are offset from each other in the direction of the spindle axis, the set object can then be accomplished in accordance with the invention by the first abutment surface/contact surface fixed relative to the adjusting element facing the turbine housing, the second abutment surface/contact surface fixed relative to the turbine housing being formed on the turbine housing, and the spindle being connected in a gastight manner to the adjusting element, by the two abutment surfaces/contact surfaces facing each other in the direction of the spindle axis, by the seal comprising between the two sheet metal rings a ring-shaped spacer element with which the sheet metal rings interact in a sealing manner with first of their ring-shaped regions lying in a radial direction in relation to the spindle axis on one side of the offsets of the sheet metal rings, by the other, second ring-shaped regions of the sheet metal rings lying resiliently against the abutment surfaces/contact surfaces, and by the two abutment surfaces/contact surfaces together with the seal and at least the spindle forming and delimiting a space which is sealed in a gastight manner except for at least a gap between the spindle and the wall of the turbine housing.

In other respects, what was described hereinabove for an actuating device in accordance with the invention with only a single sheet metal ring applies to this modification.

For reasons of simplest possible assembly alone, the sheet metal rings and the spacer element will usually be connected to one another. This can be done by spot welding since the sheet metal rings also interact in a sealing manner with the spacer element owing to their offsets, and so no gastight circular ring-shaped weld seams are necessary. The two sheet metal rings and the spacer element could, however, also be mechanically connected to one another in a different way, in particular, by a rim region of the one sheet metal ring being flanged in such a way that the flanged region engages over the spacer element and the other sheet metal ring and thereby holds the three parts together.

Preferred embodiments of the mentioned modification of the actuating device in accordance with the invention are characterized in that the sealing zones of the seal interacting with the turbine housing and the abutment surface fixed relative to the adjusting element are located in those regions of the sheet metal rings which owing to the offsets are at an enlarged distance from one another in the direction of the spindle axis. In preferred embodiments of the invention, the sealing zones of the two sheet metal rings interacting with the turbine housing and the abutment surface fixed relative to the adjusting element border on the central openings of the sheet metal rings, but, in cross section, the seal could also open outwards in a radial direction so that the two sealing zones in question border on the outer circumference of the sheet metal rings.

In preferred embodiments of the actuating device in accordance with the invention, the sheet metal ring or at least one of the sheet metal rings comprises at the rim of its opening, through which the spindle passes, centering elements which project towards the spindle axis in order to center the seal in relation to the spindle axis. Since certain tolerances with respect to the centering of the sheet metal ring or the sheet metal rings in relation to the spindle or the bush are acceptable, the centering elements need not necessarily lie against the spindle circumference or bush circumference but can receive the spindle or bush with a certain radial play between them. However, embodiments are preferred in which the centering elements are formed by projections which are flexible in the direction of the spindle axis and lie resiliently against the spindle circumference or the bush circumference. The centering elements may be in the form of small rounded noses which are already produced when the sheet metal ring or the sheet metal rings is or are punched out. Moreover, in embodiments of the actuating device in accordance with the invention with two sheet metal rings, it is adequate for only one of these sheet metal rings to comprise centering elements.

Further features, advantages and details of the invention are given in the enclosed drawings and the following description of particularly advantageous embodiments of the actuating device in accordance with the invention. In the drawings.

Figure 1A:
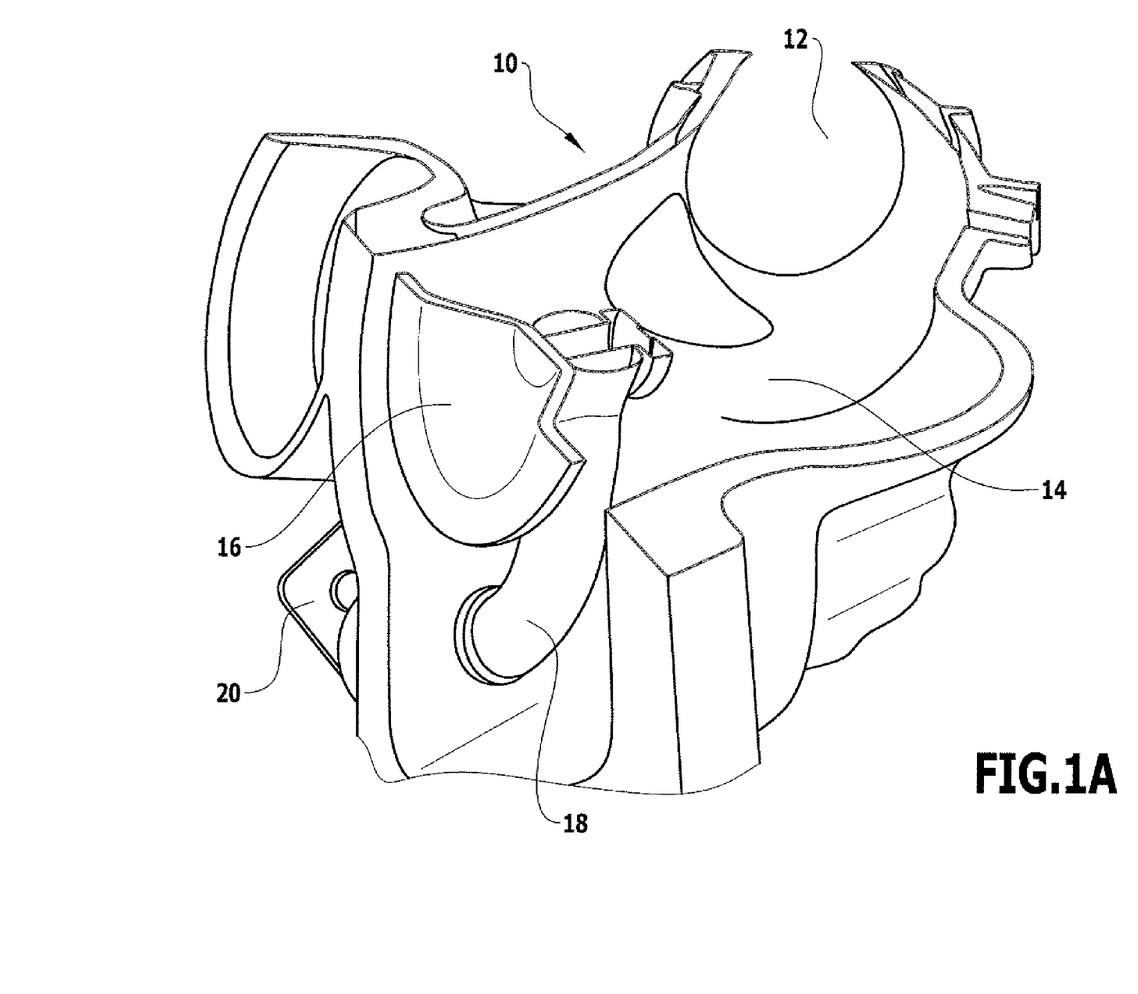
FIG. 1A shows a cut-open part of a turbine housing with a wastegate or regulating flap including actuating device in an isometric representation, with a spindle and a spindle adjusting element of the actuating device shown therein.

FIG. 1A shows a part of a turbine housing 10 into which the exhaust gas flow serving to drive an exhaust gas turbocharger turbine, not shown, enters through an exhaust gas inlet opening 12. The exhaust gas inlet opening 12 connects with an exhaust gas inflow path 14 formed in the turbine housing 10. The exhaust gas inflow path 14 leads to the turbine, and an exhaust gas flow control element 16, in this case configured as a wastegate flap, is arranged in the exhaust gas inflow path 14. This control element 16 of plate-like shape, shown only partly in FIG. 1A, can be moved in a manner described below in the exhaust gas inflow path 14 relative to the turbine housing 10 in order to completely close an exhaust gas outlet opening, not shown in FIG. 1A, formed in the wall of the turbine housing 10 to the left of the control element 16—for this purpose, the turbine housing 10 forms around the aforementioned exhaust gas outlet opening a seat for the control element 16 functioning in the manner of a valve member—or in order to open the exhaust gas outlet opening to a greater or lesser extent or completely. By means of the exhaust gas flow control element 16, a bypass channel for the exhaust gas flow, not shown, can thus be closed or partly or completely opened in order to conduct the exhaust gas flow entering the turbine housing 10 completely, partly or not at all via the exhaust gas turbocharger turbine.

Serving to actuate the exhaust gas flow control element 16 is a spindle, designated in its entirety 18, which with a section of shaft-like configuration, not shown in FIG. 1A, passes through the wall of the turbine housing 10 and with a bent section, shown in FIG. 1A, carries the control element 16 which is fixedly attached to the spindle 18. By rotating the spindle 18 relative to the turbine housing 10, the control element 16 can, therefore, be moved along a circular arc-shaped path, namely between a closed position in which the control element 16 closes the exhaust gas outlet opening, and an open position in which the control element 16 completely opens the exhaust gas outlet opening.

Finally, FIG. 1A also shows a spindle adjusting element 20 of lever-like or arm-like configuration, which is secured to the shaft-like section of the spindle 18 outside of the turbine housing 10 and, consequently, can be pivoted by means of an actuator, not shown, about the axis of the shaft-like spindle section, whereby the spindle 18 is rotated in the turbine housing 10.

Figure 1B:
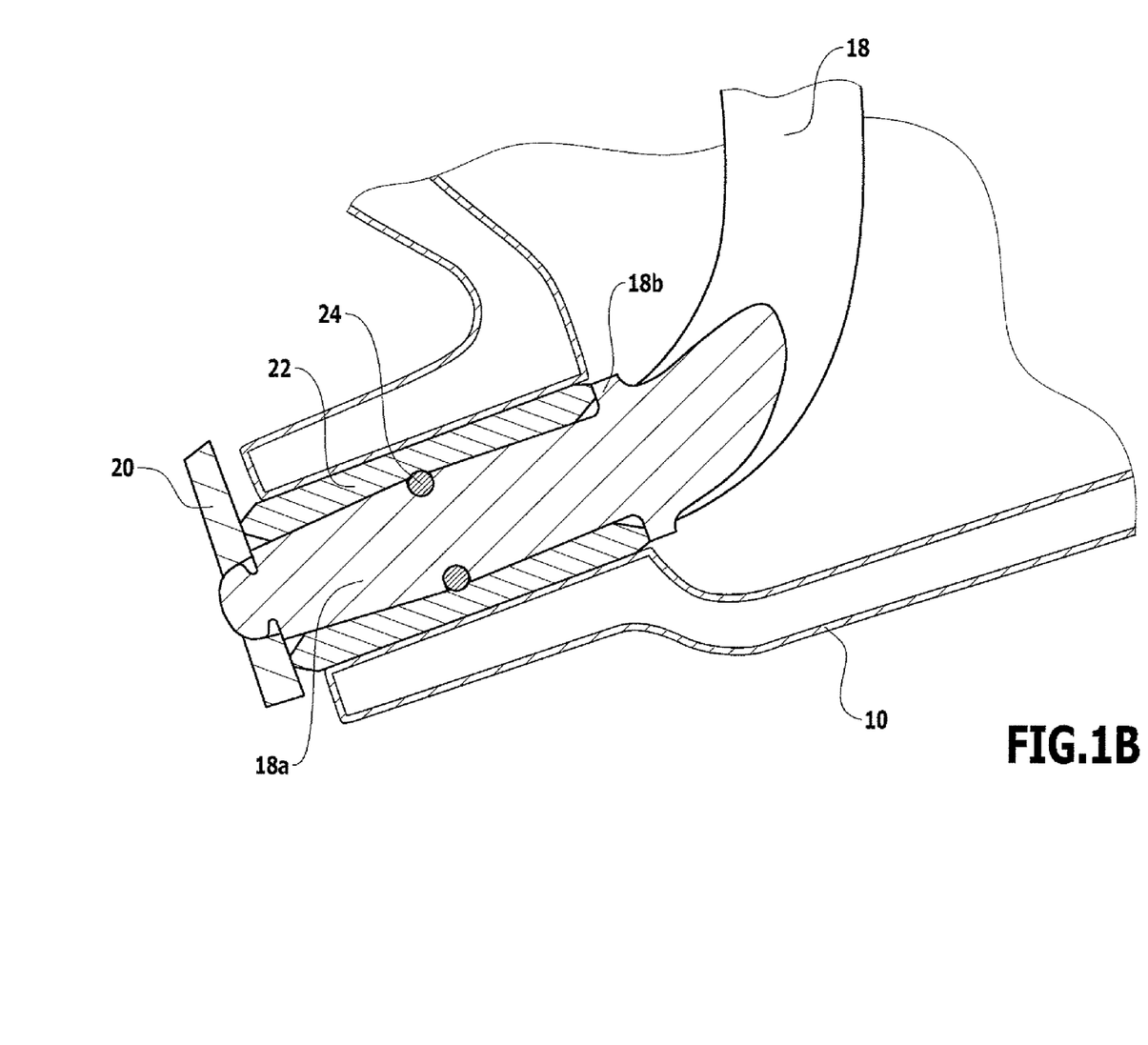
FIG. 1B shows a section through a region of the ensemble shown in FIG. 1A, with the mounting of the spindle shown therein, the spindle axis lying in the section plane, and the sealing of the lead-through of the spindle through the turbine housing not configured in accordance with the invention.

FIG. 1B shows a configuration, not in accordance with the invention, of the lead-through of the spindle 18 through the turbine housing 10. As shown in the drawing, the shaft-like section 18a of the spindle 18 is rotatably mounted in a bush 22, and an O-ring or piston ring 24 serves to seal the ring gap between the outer circumference of the spindle section 18a and the inner circumference of the bush 22. In order that the shaft-like spindle section 18a is unable to move in the axial direction in the bush 22, the spindle 18 has at its outer circumference a collar 18b (preferably also present in actuating devices in accordance with the invention) which lies against the, in accordance with FIG. 1B, right end face of the bush 22, and the adjusting element 20 secured to the spindle 18 lies against the other end face of the bush 22.

Three preferred embodiments of the actuating device in accordance with the invention will now be described hereinbelow with reference to FIGS. 2A to 4D, and, as far as possible, the same reference numerals have been used in these figures of the drawings as in FIGS. 1A and 1B.

Figure 2A:
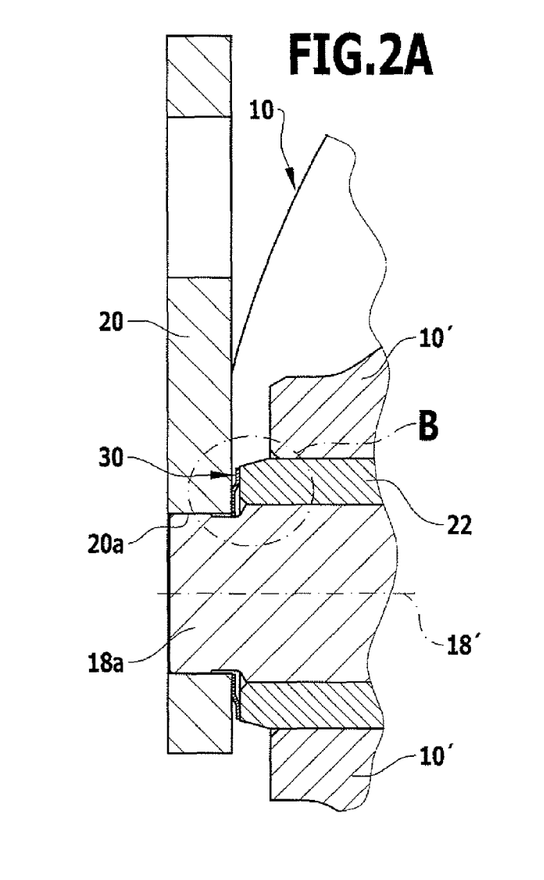
FIG. 2A shows a representation, corresponding approximately to FIG. 1B, of a first embodiment of the actuating device in accordance with the invention.
Figure 2B:
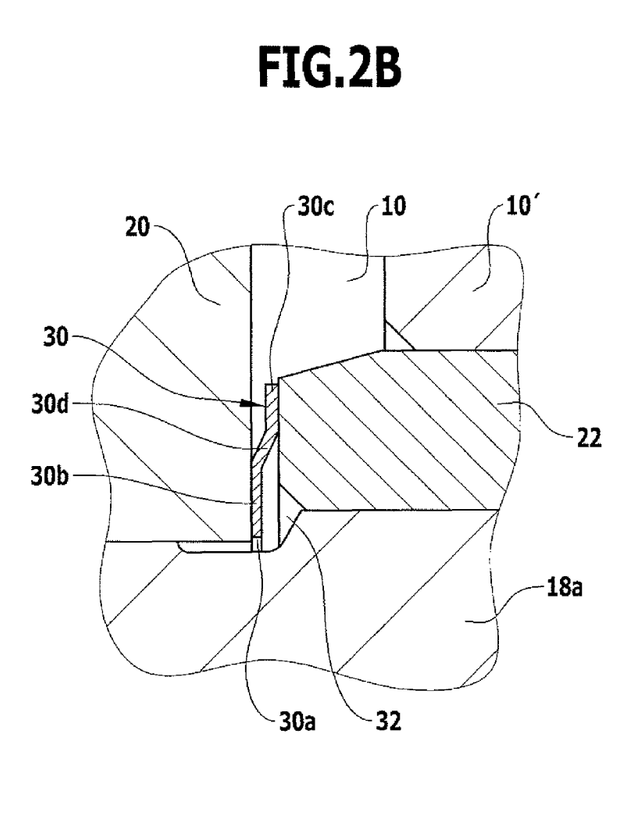
FIG. 2B shows the detail indicated by B in FIG. 2A on a larger scale.

FIGS. 2A and 2B show the turbine housing 10, insofar as it has been represented in these figures of the drawings, partly in a side view and partly in section. The part of the turbine housing shown in section has been designated 10'. The bush 22 is arranged with a pressed fit in the turbine housing part 10' shown in section. To achieve this, the bush can be pressed into the turbine housing or the press fit can be achieved by the bush 22 being inserted into the heated turbine housing so as to obtain a shrink fit after a temperature equalization. In any case, in this embodiment, the construction should, in accordance with the invention, be gastight at the interface between the outer circumference of the bush 22 and the turbine housing 10.

In accordance with the invention, the lead-through of the spindle 18 through the turbine housing 10 is sealed outside of the turbine housing 10 at the end of the lead-through by a seal 30 which—as in all other embodiments of the invention—constitutes a seal which acts and is pressed in the axial direction, and which, in the embodiment in accordance with FIGS. 2A and 2B, is a single sheet metal ring made of a nickel-based alloy, which is resistant to the relatively high temperatures (less than 650° C., but at least approximately 500° C.) prevailing at the sealing point during operation, i.e., in accordance with the invention neither changes its spring characteristics nor creeps. This sheet metal ring 30 is approximately plate-shaped, has a central opening 30a through which the spindle section 18a passes, is arranged concentrically with the axis 18' of the spindle section 18a, is of rotationally symmetrical configuration in relation to the axis 18' and has, in accordance with the invention, an inner ring region 30b and an outer ring region 30c, which are joined to each other by a middle ring region 30d.

In accordance with the invention, the inner and outer ring regions 30b and 30c are of flat configuration and lie in planes which are perpendicular to the spindle axis 18' and are offset from each other in the axial direction, whereas the middle ring region 30d extends in section along the axis 18' at an incline to the two other ring regions, so that the sheet metal ring 30 forms a half bead, which, seen in the direction of the axis 18', is of circular ring shape and results in the sheet metal ring 30 forming a component which is resilient in the direction of the axis 18'.

In accordance with the invention, the construction is such that the sheet metal ring 30, in the installed state, is resiliently pretensioned and lies with its bead feet, i.e., the transitions from the half bead into the ring regions 30b and 30c, in a gastight sealing manner, on the one hand, against the, in accordance with the figures of the drawings, left end face of the bush 22, and, on the other hand, against the adjusting element 20.

The spindle section 18a is connected to the adjusting element 20 not only in a fixed but also in a gastight manner. In the embodiment shown, the spindle section 18a engages in an opening 20a in the adjusting element 20 and is either welded to it in a gastight manner or is pressed in a gastight manner into the opening in the adjusting element 20. Consequently, in accordance with the invention, a space 32 defined and delimited by the spindle section 18a, the adjusting element 20, the bush 22 and the sheet metal ring 30 is sealed in a gastight manner except for a ring gap between the outer circumference of the spindle section 18a and the inner circumference of the bush 22.

In accordance with the invention, the sheet metal ring 30 is provided at its two main surfaces, but at least at its bead feet, with a coating by means of which the slide friction and/or the frictional wear is reduced, and which is preferably a coating of boron nitride or sintered bronze.

The second preferred embodiment in accordance with FIGS. 3A and 3B will only be described hereinbelow insofar as it differs from the embodiment in accordance with FIGS. 2A and 2B, and, therefore, as far as possible, the same reference numerals have also been used in FIGS. 3A and 3B as in FIGS. 2A and 2B.

Figure 3A:
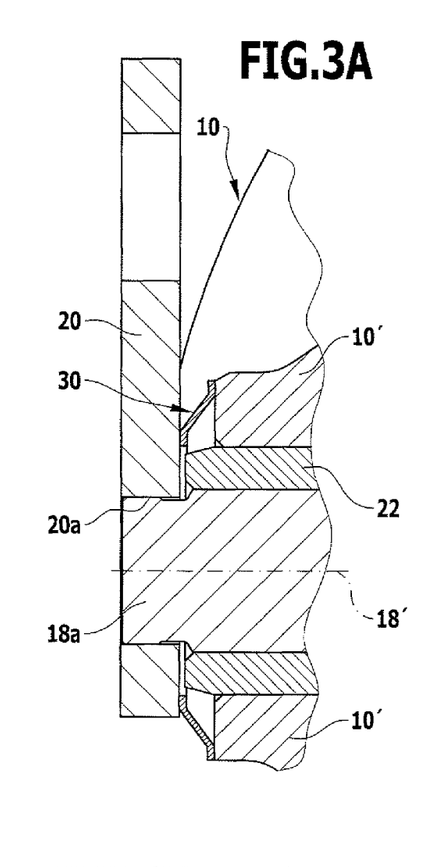
FIG. 3A shows a representation, corresponding to FIG. 2A, of a second embodiment of the actuating device in accordance with the invention.
Figure 3B:
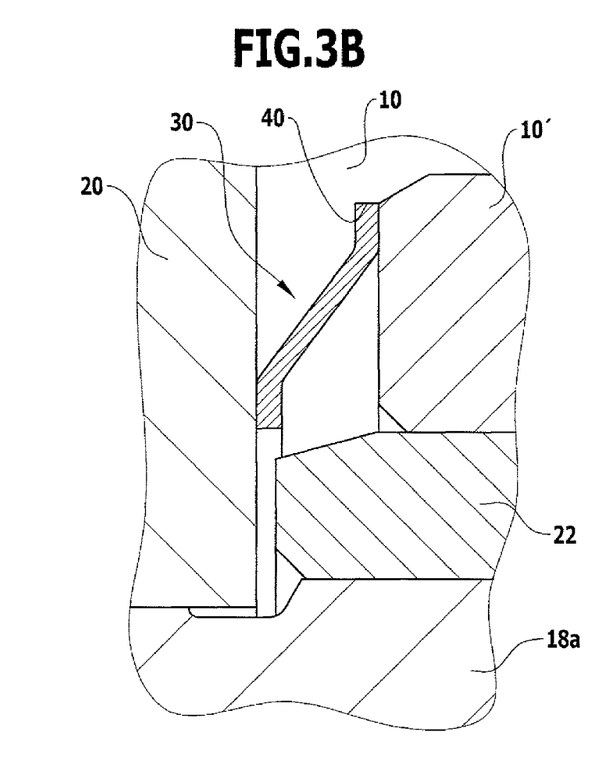
FIG. 3B shows a representation, corresponding to FIG. 2B, of this second embodiment.

In the second preferred embodiment in accordance with FIGS. 3A and 3B, the construction at the interface between the outer circumference of the bush 22 and the turbine housing 10 does not have to be gastight because the seal or the sheet metal ring 30 lies in a sealing manner, on the one hand, against the, in accordance with the figures of the drawings, left end face of the housing part 10', and, on the other hand, against the adjusting element 20. A further difference from the embodiment in accordance with FIGS. 2A and 2B is that in the embodiment in accordance with FIGS. 3A and 3B the sheet metal ring 30 can be pre-assembled on the turbine housing 10. For this purpose, it engages with a peripheral rim region in a groove 40 which the housing region 10' forms together with the remaining turbine housing 10.

With the exception of the differences explained hereinabove, the two embodiments are, however, identical in their construction and function.

The third preferred embodiment of the actuating device in accordance with the invention will now be explained with reference to FIGS. 4A to 4D. These differ from the embodiment in accordance with FIGS. 3A and 3B only with respect to the design and arrangement of the seal. Therefore, insofar as possible, the same reference numerals have been used in FIGS. 4A to 4D as in the other figures of the drawings, and the third embodiment will be described hereinbelow only insofar as it differs from the second embodiment.

Figure 4A:
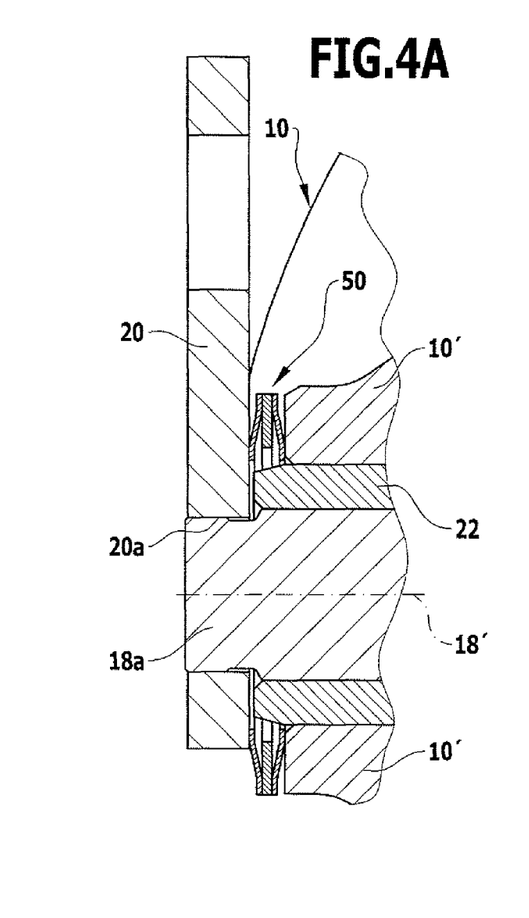
FIG. 4A shows a representation, corresponding to FIG. 2A, of a third embodiment of the actuating device in accordance with the invention.

The construction and design of a seal in accordance with the invention, designated in its entirety 50, will first be explained with reference to FIGS. 4C and 4D.

The seal 50 consists of a support ring 52 functioning as spacer element and of two sheet metal rings 54 and 56 made of a nickel-based alloy and arranged on either side of the support ring. The support ring 52, which also consists of a temperature-resistant metal, has a rectangular cross section, and each of the two sheet metal rings 54 and 56 is designed at least substantially in the same way as the sheet metal ring 30 of the first or second embodiment, disregarding the fact that in the embodiment shown in the drawings the seal 50 is of mirror-symmetrical configuration in relation to a center plane 58 extending perpendicularly to the axis 18' which, in the installed state of the seal, is the axis of the shaft-shaped spindle section 18a. However, the seal does not have to be of mirror-symmetrical configuration in relation to a center plane; rather, the two sheet metal rings acting as sealing elements could differ in design if, for reasons of the space available for the seal, this is expedient or even necessary.

The sheet metal rings 54 and 56 could each be connected to the support ring 52 by a ring-shaped weld seam which is closed within itself and, therefore, is gastight. However, as will be clear from the following, the connections between the two sheet metal rings and the support ring do not have to be gastight, and so it is also sufficient to connect the sheet metal rings and the support ring in a different way, for example, mechanically, to one another or instead of ring-shaped weld seams to affix only short or spot welds, which have been designated 60 in FIG. 4D.

Figure 4B:
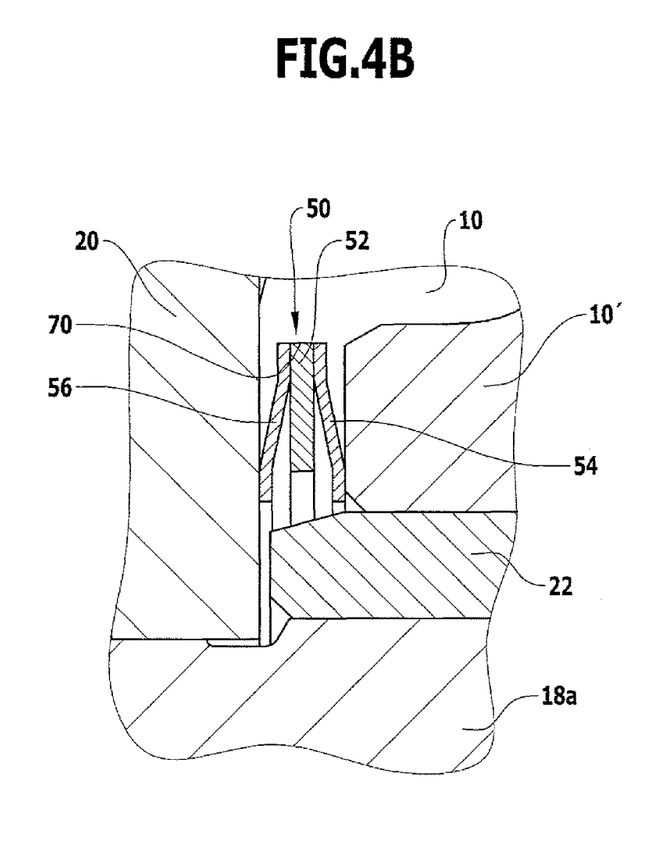
FIG. 4B shows a representation, corresponding to FIG. 2B, of this third embodiment.
Figure 4C:
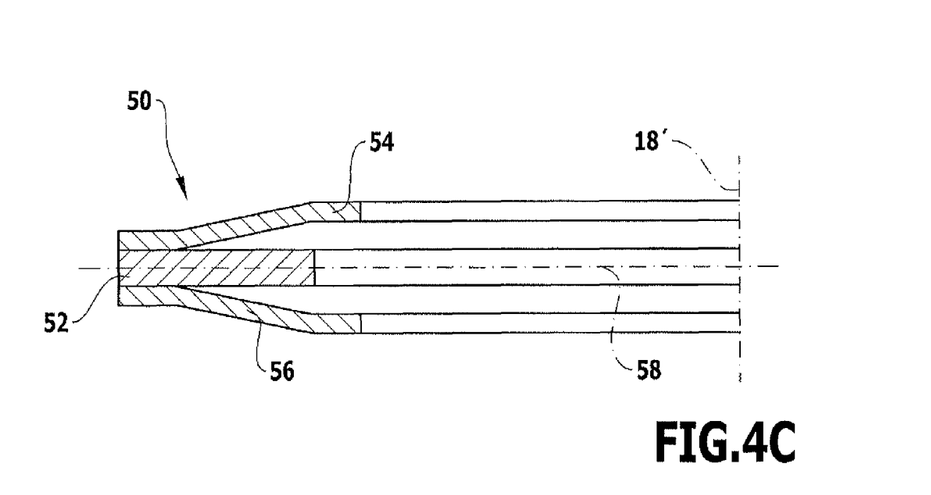
FIG. 4C shows a section through a half of a seal used in the third embodiment, with the section plane containing the axis and a diameter of the seal.
Figure 4D:
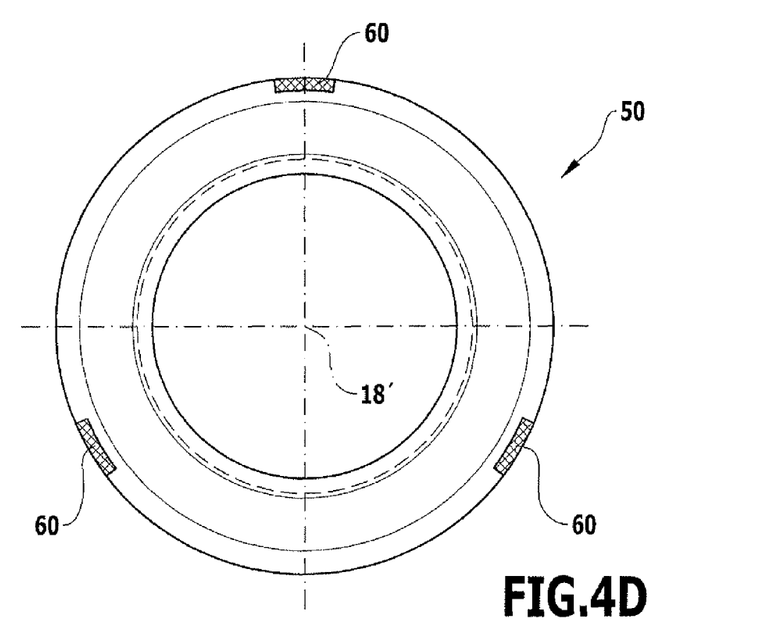
FIG. 4D shows a view of the seal used in the third embodiment, seen in the direction of the seal axis.

The seal 50 is so designed and installed that one of its sheet metal rings 54, 56 lies against the adjusting element 20, and the other sheet metal ring against an end face of the turbine housing in a resilient and pretensioned manner in the axial direction and also in a sealing manner, more particularly, with their, in accordance with FIG. 4B, radially inner bead feet. With their radially outer bead feet, the sheet metal rings 54 and 56 lie in a resilient and pretensioned manner in the axial direction and also in a sealing manner against the support ring 52.

As will be clear from FIGS. 4A and 4B, in the third embodiment, the seal 50 is held in a groove 70 which is formed by the turbine housing 10 and in which a circumferential rim region of the seal 50 engages so that in this third embodiment, too, the seal can be pre-assembled on the turbine housing.

It will also be clear from FIG. 4B that in this embodiment, too, the ring gap between the outer circumference of the bush 22 and the turbine housing or the housing part 10' does not have to be gastight because the seal 50 lies in a gastight sealing manner against the, in accordance with FIG. 4B, left end face of the housing part 10'.

In principle, regarding an embodiment with a seal made of two beaded sheet metal rings and a spacer element or support ring arranged between these the following is to be noted: Whereas FIGS. 4A and 4B show a seal 50 which opens radially inwards, such a seal in accordance with the invention may also be so configured that the seal opens radially outwards. The two sheet metal rings and the spacer element or the support ring are then connected to one another in the region of the inner circumference of the seal so that the two sheet metal rings are spaced at the greatest distance from each other in the region of the outer circumference of the seal. In such an embodiment, the radially outer bead feet then lie resiliently and pretensioned in the axial direction and in a sealing manner against a first abutment surface fixed relative to the adjusting element and a second abutment surface fixed relative to the turbine housing and facing the adjusting element. Above all, in such an embodiment, it is recommended that at least one of the two sheet metal rings be provided at its inner circumference with centering elements projecting towards the spindle axis, by means of which the seal is centered in relation to the spindle axis—such centering elements will be explained hereinbelow with reference to FIGS. 5A and 5B.

All three embodiments have the advantage that the sheet metal ring or the sheet metal rings which forms or form a spring element acting in the axial direction, in the installed state in which the seal is under pretension in the axial direction, prevents or prevent axial play of the spindle 18 which is fixedly connected to the adjusting element 20.

Finally, it should be noted that the sheet metal ring 30 or the sheet metal rings 54 and 56 are first punched out of a metal sheet without spring steel characteristics and are given their final shape by stamping, after which spring steel characteristics and the desired hardness are imparted to the sheet metal by heat treatment.

Figure 5A:
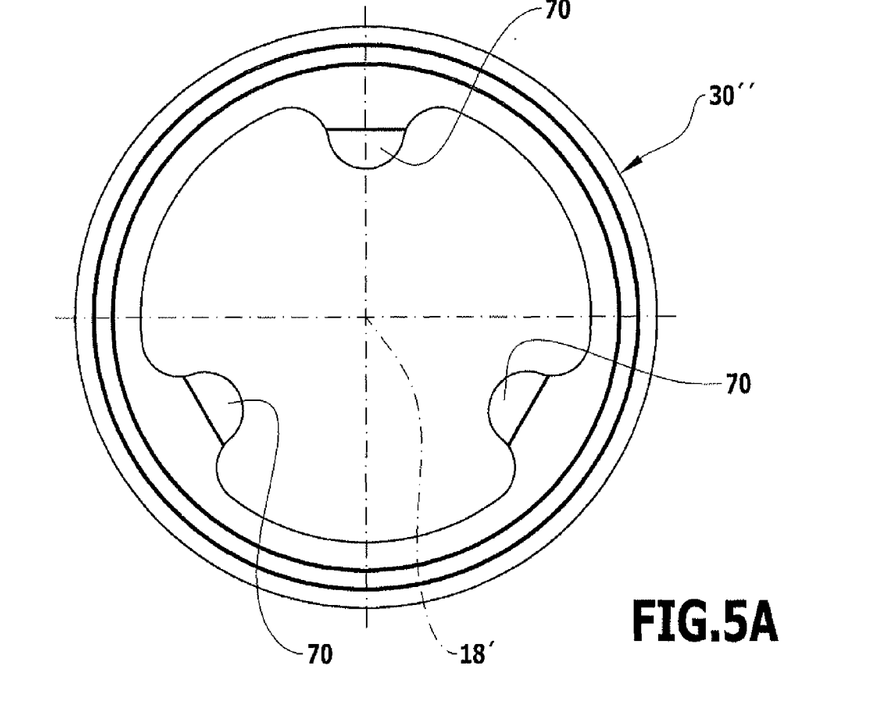
FIG. 5A shows an axial view of a sheet metal ring in accordance with the invention with centering elements.
Figure 5B:
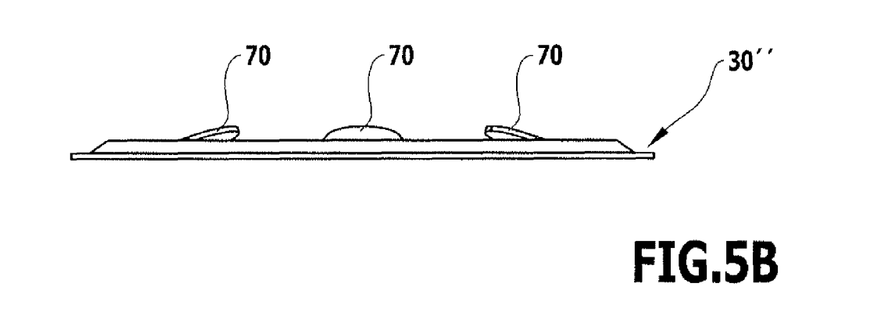
FIG. 5B shows a side view of this sheet metal ring.

A modified embodiment of the sheet metal ring 30 of the first embodiment in accordance with FIGS. 2A and 2B is shown in FIGS. 5A and 5B. This sheet metal ring has been designated 30". It differs from the sheet metal ring 30 of the first embodiment only by way of centering elements 70 which, in the preferred configuration of the sheet metal ring 30" shown, are in a form of sheet metal noses projecting in the direction towards the spindle axis 18", which were produced during the punching-out of the sheet metal ring at the inner circumference thereof. In principle, the centering elements 70 could receive between them with small radial play the outer circumference of the spindle section 18a (in analogy with the first embodiment in accordance with FIGS. 2A and 2B) or the outer circumference of the bush 22 (in analogy with the second embodiment in accordance with FIGS. 3A and 3B) as certain tolerances are normally acceptable for the centering of the sheet metal ring with respect to the spindle axis 18'. The embodiment shown in FIGS. 5A and 5B is, however, so configured that after assembly of the sheet metal ring 30", its centering elements 70 lie resiliently in a radial direction in relation to the spindle axis 18' against the outer circumference of the spindle section 18a or of the bush 22, and, for this purpose, the centering elements 70 are bent somewhat out of the plane defined by the sheet metal ring 30" in the direction of the spindle axis 18', as can be seen in FIG. 5B.

The invention claimed is:

1. An exhaust gas turbocharger for an internal combustion engine, said turbocharger having an exhaust gas driven turbine, a turbine housing, an exhaust gas inflow path, an exhaust gas flow control element arranged in the exhaust gas inflow path, and an actuating device for the exhaust gas flow control element, said actuating device comprising a spindle connected to the exhaust gas flow control element and extending through a bush which passes through a wall of the turbine housing, the bush being fixed in said wall and bordering at all operating temperatures of the turbocharger in a gastight manner on said wall, and the spindle being directly and rotatably mounted in the bush and being fixedly connected to an adjusting element located on the outside of the turbine housing and adjacent to the housing, an exhaust gas seal through which the spindle passes being arranged between a first abutment surface fixed relative to the adjusting element and a second abutment surface located on the outside of the turbine housing, fixed relative to the turbine housing and facing the adjusting element, and the two abutment surfaces each forming an exhaust gas sealing contact surface through which a spindle axis passes, said exhaust gas seal having sealing zones surrounding the spindle axis and being adapted for gas sealing interacting with said exhaust gas sealing contact surfaces, and said exhaust gas seal having only a single sheet metal ring which surrounds the spindle axis and is made of a metal having spring steel-like spring characteristics at operating temperatures of the seal, the sheet metal ring having at least one offset surrounding the spindle axis and forming a half bead such that ring-shaped regions of the sheet metal ring provide said sealing zones and lie in a radial direction in relation to the spindle axis on either side of the offset and are offset from each other in the direction of the spindle axis, the first abutment surface facing the turbine housing and the spindle being connected in a gastight manner to the adjusting element, the exhaust gas sealing contact surfaces facing each other in the direction of the spindle axis and being offset from each other in a radial direction in relation to the spindle axis, the sealing zones of the exhaust gas seal formed by the ring-shaped regions of the sheet metal ring lying resiliently in the direction of the spindle axis against the exhaust gas sealing contact surfaces, and the exhaust gas sealing contact surfaces together with the seal and at least the spindle forming and delimiting a space which is sealed in a gastight manner except for a gap between the spindle and the bush, said gap being gastightly sealed by the sheet metal ring and said exhaust gas sealing contact surfaces.

2. The turbocharger of claim 1, wherein the space is also delimited by the adjusting element.

3. The turbocharger of claim 1, wherein the sheet metal ring forms at transitions from the offset into the ring-shaped regions, in each case, a sealing line with high pressure between the sheet metal ring and the exhaust gas sealing contact surfaces.

4. The turbocharger of claim 1, wherein the second abutment surface is formed on the bush.

5. The turbocharger of claim 4, wherein the second abutment surface is formed on an end face of the bush that faces the adjusting element.

6. The turbocharger of claim 1, wherein the second abutment surface is formed on the turbine housing.

7. The turbocharger of claim 1, wherein the first abutment surface is formed on the adjusting element.

8. The turbocharger of claim 1, wherein the contact surfaces in section along the spindle axis are of flat and smooth configuration.

9. The turbocharger of claim 1, wherein the exhaust gas sealing contact surfaces and the sealing zones extend perpendicularly to the spindle axis.

10. The turbocharger of claim 1, wherein the exhaust gas sealing contact surfaces and the sealing zones and the offset of the sheet metal ring are formed and arranged concentrically in relation to the spindle axis.

11. The turbocharger of claim 1, wherein the offset of the sheet metal ring has a height measured in the direction of the spindle axis and a width measured in a radial direction in relation to the spindle axis, the ratio of said height to said width being between 1:2 and 1:7.

12. The turbocharger of claim 1, wherein the sheet metal ring is provided at least in the region of its sealing zones with a coating reducing at least one of slide friction and frictional wear.

13. The turbocharger of claim 12, wherein the coating consists at least substantially of boron nitride or sintered bronze.

14. The turbocharger of claim 1, wherein the sheet metal ring consists of a material which is resistant with respect to its characteristics at all operating temperatures of the seal.

15. The turbocharger of claim 1, wherein the sheet metal ring is formed from a nickel-based alloy.

16. The turbocharger of claim 1, wherein the exhaust gas flow control element is a wastegate flap.

17. The turbocharger of claim 1, wherein the exhaust gas flow control element is a regulating flap of a multistage exhaust gas turbocharger system.

18. The turbocharger of claim 1, wherein the turbocharger has a turbine with variable turbine geometry and the flow control element is a flow directing element for said turbine.

19. The turbocharger of claim 1, wherein the sheet metal ring has an opening traversed by the spindle, said opening having a rim at which the sheet metal ring comprises centering elements which project towards the spindle axis.

20. The turbocharger of claim 19, wherein the centering elements are formed by projections which are flexible in the direction of the spindle axis and lie resiliently against one of a circumference of the spindle and a circumference of the bush.

21. An actuating device for an exhaust gas flow control element arranged in an exhaust gas inflow path of an exhaust gas turbocharger turbine of an internal combustion engine, the actuating device comprising a spindle connected to the control element and extending through a channel which passes through a wall of a turbine housing, the spindle being rotatably mounted in the channel and being fixedly connected to an adjusting element located on the outside of the turbine housing and adjacent to the housing, a seal through which the spindle passes being arranged between a first abutment surface fixed relative to the adjusting element and a second abutment surface located on the outside of the turbine housing, fixed relative to the turbine housing and facing the adjusting element, and the two abutment surfaces each forming a contact surface through which the spindle axis passes and which functions as a sealing point, sealing zones of the seal surrounding the spindle axis interacting in a sealing manner with these contact surfaces, and the seal having two sheet metal rings which surround the spindle axis and are made of a metal having spring steel-like spring characteristics at all operating temperatures of the seal, and each of which has one offset surrounding the spindle axis and forming a half bead such that first and second ring-shaped regions of the sheet metal ring lie in a radial direction in relation to the spindle axis on either side of the offset and are offset from each other in the direction of the spindle axis, the first abutment surface facing the turbine housing, the second abutment surface being formed on the turbine housing, and the spindle being connected in a gastight manner to the adjusting element, the two contact surfaces facing each other in the direction of the spindle axis, the seal comprising between the two sheet metal rings a ring-shaped spacer element with which the sheet metal rings interact in a sealing manner with the first of their ring-shaped regions lying in a radial direction in relation to the spindle axis on one side of the offsets of the sheet metal rings, the other, second ring-shaped regions of the sheet metal rings lying resiliently against the contact surfaces, and the two contact surfaces together with the seal and at least the spindle forming and delimiting a space which is sealed in a gastight manner except for at least a gap between the spindle and the wall of the turbine housing.

22. The actuating device in accordance with claim 21, wherein the first ring-shaped regions of the sheet metal rings lie resiliently against the spacer element.

23. The actuating device in accordance with claim 21, wherein the offsets of the two sheet metal rings extend away from the spacer element in the direction of the spindle axis.

24. The actuating device in accordance with claim 21, wherein the first ring-shaped regions of the sheet metal rings and the spacer element are connected to one another.

25. The actuating device in accordance with claim 21, wherein the space is also delimited by the adjusting element.

26. The actuating device in accordance with claim 21, wherein each sheet metal ring forms at a transition from the offset into the second ring-shaped region a sealing line with high pressure between the sheet metal ring and the adjacent contact surface.

27. The actuating device in accordance with claim 21, wherein each sheet metal ring forms at a transition from the offset into the first ring-shaped region a sealing line with high pressure between the sheet metal ring and the spacer element.

28. The actuating device in accordance with claim 21, wherein the spindle is rotatably mounted in a bush which passes through the wall of the turbine housing.

29. The actuating device in accordance with claim 28, wherein the bush borders in a gastight manner on the wall of the turbine housing.

30. The actuating device in accordance with claim 21, wherein the first abutment surface is formed on the adjusting element.

31. The actuating device in accordance with claim 21, wherein the contact surfaces in section along the spindle axis are of flat and smooth configuration.

32. The actuating device in accordance with claim 21, wherein the contact surfaces and the sealing zones extend perpendicularly to the spindle axis.

33. The actuating device in accordance with claim 21, wherein the contact surfaces and the sealing zones and the offset of the sheet metal rings are formed and arranged concentrically in relation to the spindle axis.

34. The actuating device in accordance with claim 21, wherein the offset of said sheet metal rings has a height measured in the direction of the spindle axis and a width measured in a radial direction in relation to the spindle axis, the ratio of said height to said with being between 1:2 and 1:7.

35. The actuating device in accordance with claim 21, wherein at least one of the sheet metal rings is provided at least in the region of its sealing zone with a coating which reducing at least one of slide friction and frictional wear.

36. The actuating device in accordance with claim 35, wherein the coating consists at least substantially of boron nitride or sintered bronze.

37. The actuating device in accordance with claim 21, wherein the sheet metal rings consist of a material which is resistant with respect to its characteristics at operating temperatures of the seal.

38. The actuating device in accordance with claim 21, wherein the sheet metal rings are formed from a nickel-based alloy.

39. The actuating device in accordance with claim 21, wherein each of the sheet metal rings has an opening traversed by the spindle, each of said openings having a rim, and wherein at least one of the sheet metal rings comprises at said rim, centering elements which project towards the spindle axis.

40. The actuating device in accordance with claim 39, wherein the centering elements are formed by projections which are flexible in the direction of the spindle axis and lie resiliently against a circumference of the spindle.

41. The actuating device in accordance with claim 21, wherein the sealing zones of the seal are located in regions of the sheet metal rings which owing to the offsets are at an enlarged distance from one another in the direction of the spindle axis.

42. The actuating device in accordance with claim 21, wherein the exhaust gas flow control element is a wastegate flap.

43. The actuating device in accordance with claim 21, wherein the exhaust gas flow control element is a regulating flap of a multistage exhaust gas turbocharger system.

44. The actuating device in accordance with claim 21, wherein the exhaust gas flow control element is a flow directing element for an exhaust gas turbocharger turbine with variable turbine geometry.

45. The turbocharger of claim 11, wherein said ratio is between 1:4 and 1:6.

46. The turbocharger of claim 11, wherein said ratio is about 1:5.

47. The actuating device in accordance with claim 24, wherein said first ring-shaped regions and the spacer are welded to one another.

48. The actuating device in accordance with claim 34, wherein said ratio is between 1:4 and 1:6.

49. The actuating device in accordance with claim 34, wherein said ratio is about 1:5.

50. The actuating device in accordance with claim 39, wherein the spindle is rotatably mounted in a bush which passes through the wall of the turbine housing, and wherein the centering elements are formed by projections which are flexible in the direction of the spindle axis and lie resiliently against a circumference of the bush.

* * * * *